United States Patent
Lyne et al.

(10) Patent No.: US 9,473,295 B2
(45) Date of Patent: *Oct. 18, 2016

(54) VIRTUAL TRANSPORTATION POINT OF SALE

(71) Applicant: Cubic Corporation, San Diego, CA (US)

(72) Inventors: Malcolm Lyne, San Diego, CA (US);
David deKozan, San Diego, CA (US);
Pradip Mistry, San Diego, CA (US);
Boris Karsch, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/940,455

(22) Filed: Jul. 12, 2013

(65) Prior Publication Data
US 2013/0305035 A1 Nov. 14, 2013

Related U.S. Application Data

(63) Continuation-in-part of application No. 13/627,079, filed on Sep. 26, 2012.

(60) Provisional application No. 61/539,345, filed on Sep. 26, 2011, provisional application No. 61/671,584, filed on Jul. 13, 2012.

(51) Int. Cl.
*H04L 29/06* (2006.01)
*H04L 9/00* (2006.01)
(Continued)

(52) U.S. Cl.
CPC ............. *H04L 9/00* (2013.01); *G06Q 20/3278* (2013.01); *G06Q 20/352* (2013.01); *G06Q 30/06* (2013.01);
(Continued)

(58) Field of Classification Search
CPC ................... H04L 2209/805; H04L 63/0492; H04L 9/00; H04L 9/0866; H04L 9/0877
See application file for complete search history.

(56) References Cited

U.S. PATENT DOCUMENTS

| 4,798,322 A | 1/1989 | Berstein et al. |
| 5,295,188 A | 3/1994 | Wilson et al. |

(Continued)

FOREIGN PATENT DOCUMENTS

| EP | 690399 A2 | 1/1996 |
| EP | 758777 A2 | 2/1997 |

(Continued)

OTHER PUBLICATIONS

Office Action in U.S. Appl. No. 13/627,079. mailed on Mar. 24, 2014, 17 pages.

(Continued)

*Primary Examiner* — Chau Le
(74) *Attorney, Agent, or Firm* — Kilpatrick Townsend & Stockton LLP

(57) ABSTRACT

Embodiments provided herein include techniques for enabling a mobile device to communicate with smart media in a manner that can sidestep the secure element of the mobile device—and the costs associated with it. The mobile device can communicate with the smart media using near-field communication (NFC) by creating an encrypted connection with a remote computer while bypassing a secure element of the mobile device. This allows the mobile device to provide point-of-sale (POS) functionality by reading and/or writing to the smart media, without compromising the security of the smart media.

21 Claims, 8 Drawing Sheets

(51) Int. Cl.
*H04W 12/02* (2009.01)
*H04W 4/00* (2009.01)
*G06Q 30/06* (2012.01)
*G06Q 20/32* (2012.01)
*G06Q 20/34* (2012.01)
*H04L 9/08* (2006.01)

(52) U.S. Cl.
CPC ............. *H04W 4/008* (2013.01); *H04W 12/02* (2013.01); *H04L 9/0866* (2013.01); *H04L 9/0877* (2013.01); *H04L 63/0492* (2013.01); *H04L 2209/805* (2013.01)

(56) References Cited

U.S. PATENT DOCUMENTS

| | | |
|---|---|---|
| 5,347,580 A | 9/1994 | Molva et al. |
| 5,414,772 A | 5/1995 | Naccache et al. |
| 5,530,232 A | 6/1996 | Taylor |
| 5,544,246 A | 8/1996 | Mandelbaum et al. |
| 5,546,463 A | 8/1996 | Caputo et al. |
| 5,623,637 A | 4/1997 | Jones et al. |
| 5,664,157 A | 9/1997 | Takahira et al. |
| 5,677,955 A | 10/1997 | Doggett et al. |
| 5,714,741 A | 2/1998 | Pieterse et al. |
| 5,727,230 A | 3/1998 | Fujioka |
| 5,729,594 A | 3/1998 | Klingman |
| 5,745,571 A | 4/1998 | Zuk |
| 5,778,071 A | 7/1998 | Caputo et al. |
| 5,847,447 A | 12/1998 | Rozin et al. |
| 5,878,142 A | 3/1999 | Caputo et al. |
| 6,101,477 A | 8/2000 | Hohle et al. |
| 6,226,744 B1 | 5/2001 | Murphy et al. |
| 6,304,223 B1 | 10/2001 | Hilton et al. |
| 7,437,560 B1 | 10/2008 | Page et al. |
| 2004/0059908 A1 | 3/2004 | Yamada et al. |
| 2004/0072592 A1 | 4/2004 | Haasegawa |
| 2005/0197859 A1 | 9/2005 | Wilson et al. |
| 2006/0102717 A1 | 5/2006 | Wood et al. |
| 2006/0149962 A1 | 7/2006 | Fountain et al. |
| 2008/0052233 A1 | 2/2008 | Fisher et al. |
| 2009/0265776 A1 | 10/2009 | Baentsch et al. |
| 2010/0007466 A1 | 1/2010 | Shoarinejad et al. |
| 2010/0327054 A1 | 12/2010 | Hammad |
| 2013/0086375 A1 | 4/2013 | Lyne et al. |

FOREIGN PATENT DOCUMENTS

| | | |
|---|---|---|
| EP | 924667 A2 | 6/1999 |
| EP | 2106191 A1 | 9/2009 |
| WO | 91/14237 A1 | 9/1991 |
| WO | 95/30975 A1 | 11/1995 |
| WO | 97/10562 A1 | 3/1997 |
| WO | 98/52151 A1 | 11/1998 |
| WO | 01/08110 A1 | 2/2001 |
| WO | 2004/019282 A1 | 3/2004 |
| WO | 2009/082748 A1 | 7/2009 |

OTHER PUBLICATIONS

U.S. Appl. No. 09/360,068, filed Jul. 23, 1999, Non-Final Office Action mailed on Mar. 15, 2004, 9 pages.
U.S. Appl. No. 09/360,068, filed Jul. 23, 1999, Non-Final Office Action mailed on Jan. 25, 2005, 11 pages.
U.S. Appl. No. 09/360,068, filed Jul. 23, 1999, Non-Final Office Action mailed on Jul. 13, 2005, 11 pages.
U.S. Appl. No. 09/360,068, filed Jul. 23, 1999, Non-Final Office Action mailed on Feb. 9, 2006, 11 pages.
U.S. Appl. No. 09/360,068, filed Jul. 23, 1999, Final Office Action mailed on Aug. 10, 2006, 13 pages.
U.S. Appl. No. 09/360,068, filed Jul. 23, 1999, Non-Final Office Action mailed Dec. 29, 2006, 14 pages.
U.S. Appl. No. 09/360,068, filed Jul. 23, 1999, Non-Final Office Action mailed Aug. 7, 2007, 16 pages.
U.S. Appl. No. 09/360,068, filed Jul. 23, 1999, Final Office Action mailed on Feb. 20, 2008, 17 pages.
PCT International Search Report and Written Opinion of PCT/US2013/050340 mailed on Oct. 31, 2013, 215 pages.
PCT International Search Report and Written Opinion of PCT/US2012/057345 mailed on Feb. 28, 2013, 9 pages.

VIRTUAL TRANSPORTATION POINT OF SALE

CROSS-REFERENCE TO RELATED APPLICATIONS

The present application is a continuation-in-part of U.S. application Ser. No. 13/627,079, filed Sep. 26, 2012, entitled "PERSONAL POINT OF SALE" which claims the benefit under 35 USC 119(e) of 61/539,345, filed Sep. 26, 2011, entitled "MOBILE PHONE SECURE TOP UP". The present application also claims the benefit under 35 USC 119(e) of 61/671,584, filed Jul. 13, 2012, entitled "VIRTUAL TRANSPORTATION POINT OF SALE". Each of these applications is hereby incorporated by reference in its entirety for all purposes.

BACKGROUND

Many systems, such as transit systems, in which contactless smart cards or similar media are used, conduct transactions by reading from and/or writing to the contactless smart cards. To do so, a specialized card reader is often needed; the card reader being configured to communicate with the contactless smart card using established smart card communication standards. Transit and other systems are, however, limited in their ability to deploy these card readers, which can impede a user's ability to conduct transactions where a card reader is not available.

BRIEF SUMMARY

Embodiments provided herein include techniques for enabling a back-end system to communicate with smart media via a third-party card reader. This can allow transit, parking, banking, and/or other systems to provide point-of-sale (POS) functionality by reading and writing to the smart media using third-party card readers, without compromising the security of the smart media. Such functionality can enable systems to drastically expand the network of card readers available to end users.

An example method of establishing a secure connection with a smart media, according to the disclosure, includes receiving, from a card reader, identifying information regarding the smart media, and determining, with a computer, an encryption key based on the identifying information. The method further includes establishing a secure communications link between the computer and the card reader. The secure communications link can be established based on at least a portion of information read from the smart media by the card reader. The method also includes communicating encrypted data to the card reader, via the secure communications link, to be written on the smart media.

The example method can include one or more of the following features. The smart media system can include a parking system database. The method can include receiving, from the card reader, information indicative of a payment, and communicating, to the card reader, value data to be written on the smart media. The value data can include data corresponding to at least one of a product, a unique reference transaction, an updated command, a deducted value, or validation of a pass. The method can further include receiving, from the card reader, information indicative of usage of the smart media, and debiting the smart media, via the card reader, a value associated with the usage of the smart media. The smart media can include at least one of a contactless smart card, a virtual card residing on an electronic device, a credit card, a debit card, or a radio-frequency identification (RFID) tag. The method can also include receiving, from the card reader, information indicative of user input. The information indicative of the user input can include at least one of login information, payment source information, payment amount information, or an indication of a product or service for purchase.

An example non-transitory computer-readable medium, according to the disclosure, can have instructions embedded thereon enabling a smart media to be used at a card reader. The instructions can include computer-executable code for receiving, from a card reader, identifying information regarding the smart media, determining an encryption key based on the identifying information, and establishing a secure communications link with the card reader. The secure communications link can be established based on at least a portion of information read from the smart media by the card reader. The instructions can also include computer-executable code for communicating encrypted data to the card reader, via the secure communications link, to be written on the smart media.

The example non-transitory computer-readable medium can include instructions for implementing one or more of the following features. Communicating a transaction summary to a smart media system. Communicating parking information to the smart media system. Receiving, from the card reader, information indicative of a payment, and communicating, to the card reader, value data to be written on the smart media, the value data corresponding to a value of the payment. Receiving, from the card reader, information indicative of usage of the smart media, and debiting the smart media, via the card reader, a value associated with the usage of the smart media. Communicating with a smart media comprising at least one of a contactless smart card, a virtual card residing on an electronic device, a credit card, a debit card, or a radio-frequency identification (RFID) tag. Receiving, from the card reader, information indicative of user input. Receiving the information indicative of the user input comprising at least one of login information, payment source information, payment amount information, or an indication of a product or service for purchase.

An example computer server configured to establish a secure connection with a smart media via a card reader, according to the disclosure, can include a communications interface, a processing unit coupled with the communications interface, and a memory coupled with the processing unit. The memory can include instructions that, when executed by the processing unit, cause the computer server to receive, from a card reader, identifying information regarding the smart media determine an encryption key based on the identifying information, and establish, via the communications interface, a secure communications link with the card reader. The secure communications link can be established based on at least a portion of information read from the smart media by the card reader. The memory can further include instructions for communicating encrypted data to the card reader, via the secure communications link, to be written on the smart media.

The example computer server can include one or more of the following features. The memory can further include instructions for causing the computer server to communicate a transaction summary to a smart media system. The transaction summary can include information regarding a parking transaction. The memory can further include instructions for causing the computer server to receive, from the card reader, information indicative of a payment, and communicate, to the card reader, value data to be written on the smart media, the value data corresponding to a value of the payment.

Numerous benefits are achieved over conventional techniques. For example, a user can update smart media a card reader that is not deployed by the system in which the smart media is used. This not only can improve user experience by increasing a user's ease of access to card readers in which the user can engage in POS transactions, but it can also allow a transit agency or other system to reduce the cost of deploying and maintaining its own network of card readers. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
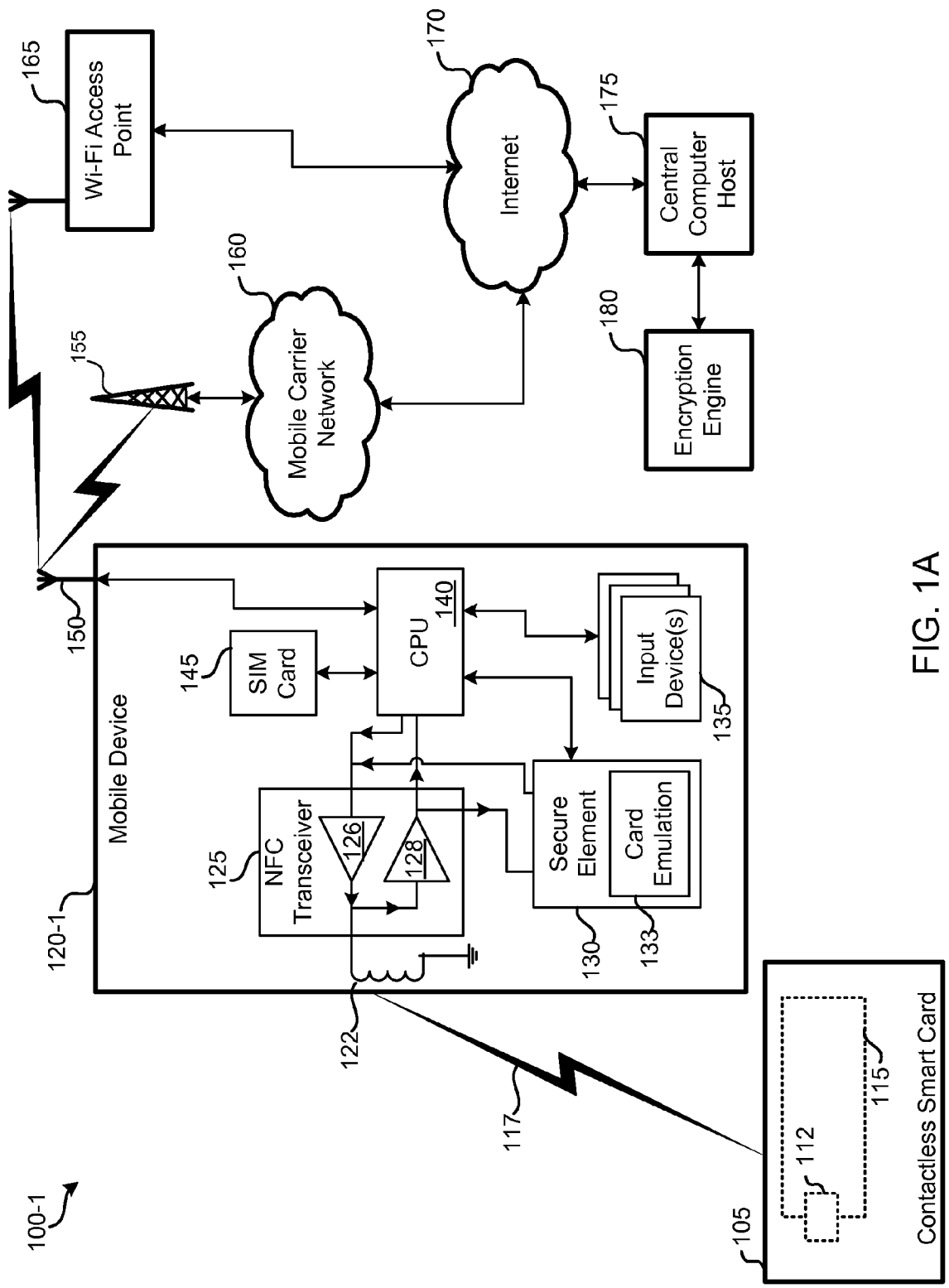
FIGS. 1A and 1B are simplified hardware block diagrams of embodiments of a system for enabling a mobile device to communicate with smart media.

For the purposes of explanation, the ensuing numerous provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments provided herein include techniques for enabling a mobile device such as mobile phones, smart phones, tablet computers, personal media players, laptop computers, and other portable electronic devices, to securely communicate with smart media including, but not limited to, smart cards radio-frequency identification (RFID) tags, credit cards, debit cards, tickets, and the like. The smart media—in any physical form (card, ticket, RFID, etc.)—can include a memory with information such as a unique identifier (e.g., card number, serial number, etc.) and/or other information such as an electronic purse (cash), one or more products (e.g., passes), an origin and/or destination, validity parameters, and/or individual tickets, depending on the application in which the smart media is used (transit, transportation, event ticketing, etc.). The mobile device can communicate with the smart media using near-field communication (NFC) by creating an encrypted connection with a remote computer while bypassing a secure element of the mobile device. This allows the mobile device to read and write to the smart media using standard protocols (e.g., ISO 14443) and Internet connectivity via standard networks (e.g. Wi-Fi 802.11, 3G, 4G, and the like), without compromising the security of the smart media.

In some embodiments, the ability to read and/or write to smart media can include formatting and/or initializing the smart media. For example, using the techniques described herein below to read and/or write to the smart media, a mobile device may be utilized to initialize a smart media for use. In so doing, the smart media may be formatted, and encryption keys may be written to the smart media. Such functionality can facilitate the distribution of such smart media because the smart media would not have to be pre-encoded prior to delivery. Moreover, such encoding could help ensure the smart media receives the most recent formatting and/or security key(s).

Because techniques provided herein enable a mobile device to read from and write to smart media, the mobile device to function as a personal point-of-sale (POS) device to a user. The POS device can conduct point-of-sale transactions such as the sale of a product or service, ticket validation (e.g., debit a value from the smart media and/or cancel a ticket), and the like. For example, a user may use the mobile device to both purchase a product and update the smart media accordingly to reflect the purchase.

FIG. 1A is a simplified hardware block diagram of a first embodiment 100-1 of a system for enabling a mobile device 120-1 to communicate with the smart media. In this embodiment, the mobile device 120-1 utilizes native NFC capabilities to read and write to a contactless smart card 105 (or other smart media). It will be understood that the first embodiment 100-1 is provided as an example. Other embodiments of an IC 100 may include more, less, and/or different components, depending on desired functionality.

In this first embodiment 100-1, the mobile device 120-1 can include an NFC transceiver with modulation 126 and demodulation 128 circuitry enabling the mobile device 120-1 to establish a contactless communication link 117 with a contactless smart card 105 via an NFC antenna 122. The contactless smart card 105 (and/or other smart media) can include an antenna loop 115 and circuitry 112 to store information and communicate via contactless communication link 117. In some embodiments, the contactless smart card 105 and/or other smart media can communicate using ISO 14443 standards, and may be induction and/or battery powered.

The mobile device 120-1 also can include a secure element 130. In certain applications, the secure element 130 can be utilized to emulate cards, RFID tags, and/or other smart media with card emulation 133, communicating information via the NFC transceiver 125. The secure element 130 can offer encrypted communications and secure channels to help keep sensitive information (e.g., credit card and/or other account information, personal data, etc.) from being compromised. However, as indicated above, it can cost a user to utilize the secure element in this manner. Thus, embodiments can bypass the secure element 130 to allow a user to use a contactless smart card 105 (and/or other smart media) and avoid the costs associated with the secure element 130. As described in more detail below, communication with the smart media can still be encrypted by, for example, a central computer host 175, in which case the mobile device 120-1 can simply relay encrypted information between the contactless smart card 105 and the central computer host 175. That said, some embodiments may utilize the secure element 130.

In this first embodiment 100-1, the mobile device 120-1 includes other components, such as a central processing unit (CPU) 140, input device(s) 135, and subscriber identity module (SIM) card 145. Among other things, the SIM card 145 can be used to identify the mobile device 120-1 and/or a related user to the central computer host 175. Input device(s) 135 can be utilized to enable a user to provide input in any of a variety of ways. For example, the input device(s) 135 can include a touch screen, button(s), microphone, camera, and the like. In some embodiments, depending on the model of the mobile device 120-1 and mobile carrier network 160, the secure element 130 may be present as either embedded in the mobile phone hardware and/or firmware, embedded in the subscriber identity module (SIM) card 145, and/or included in a separate form factor, such as micro SD card.

The CPU 140 can be used to process information and coordinate the functionality of the various components of the mobile device 120-1. The CPU 140 can include one or more general-purpose processors and/or one or more special-purpose processors (such as digital signal processing chips, graphics acceleration processors, microprocessors, and/or the like). The CPU may be configured to execute one or more computer programs stored, for example, on a computer-readable storage medium (not shown), or memory, such as a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Moreover, the computer-readable storage medium can be removable, incorporated into the mobile device 120-1, and/ or communicatively coupled with the mobile device 120-1 via a communication interface.

The mobile device 120-1 can communicate with one or more communication networks via one or more antenna(s) 150. Such communication networks can include a mobile carrier network (e.g., cell phone service via cell phone tower 155), the Internet 170 (via Wi-Fi access point 165), and/or other networks. In the first embodiment 100-1 of FIG. 1A, the mobile device is able to gain access to the Internet 170 via either or both of a Wi-Fi access point 165 or a mobile carrier network 160. The Internet 170, in turn, provides the mobile device 120-1 access to the central computer host 175. In other embodiments, other forms of wireless and/or wired communication can be utilized, depending on desired functionality.

The central computer host 175 can comprise one or more computers configured to manage and/or update smart media, such as the contactless smart card 105. To this end, it can manage and/or access one or more encryption key(s) associated with each smart media. In some embodiments, such as the first embodiment 100-1 of FIG. 1A, encryption keys may be stored externally in an encryption engine 180 such as a separate computer and/or a specialized encryption hardware.

In this first embodiment 100-1, the contactless smart card 105 can be written to as follows. A user may bring contactless smart card 105 within a range of the mobile device 120-1 sufficient to activate the contactless smart card 105 and start an initial communication between the mobile device 120-1 and the contactless smart card 105. The user may activate a software application executed by the mobile device 120-1 before doing so. The software application can, for example, enable a user to perform various point-of-sale transactions such as load value to the electronic purse, purchase a product and/or validate a ticket, deliver an electronic benefit (e.g., debit a card and/or inactivate or cancel a ticket, inactivate and/or cancel the card, deliver a monthly employer transit benefit, etc.), in which data of the contactless smart card 105 is to be updated accordingly. In some embodiments, the software application can perform functions that do not necessarily result in updating a value on the card. For example, the software application can perform enforcement actions in which a value and/or other information is read from a card to ensure fare compliance. To complete a transaction involving reading and/or writing to the contactless smart card 105, the software application can prompt the user to bring contactless smart card 105 within a range of the mobile device 120-1 (e.g., tap the contactless smart card 105 to the mobile device 120-1).

During the initial communication, the mobile device 120-1 can read certain unsecure information from the contactless smart card 105, such as a serial, card, and/or account number; a name of a user associated with the contactless smart card 105; and the like. The mobile device 120-1 then can connect with the central computer host 175 via the Internet 170, using a data connection provided by the mobile carrier network 160, Wi-Fi access point 165, and/or another communication means with the Internet. In some embodiments, the user may input identifying information (e.g., login ID, password, etc.) using input device(s) 135, which can be used to establish an authenticated connection with the central computer host 175.

Using the serial number and/or other information provided by the mobile device 120-1, the central computer host can then establish a secure communications link with the mobile device. Information communicated via the secure communications link can be encrypted using one or more encryption keys associated with the contactless smart card 105. The encryption may take place in the central computer host using locally stored keys 175 and/or take place in the external encryption engine 180.

The encrypted information from the central computer host 175 can be sent to the contactless smart card 105 and used to update secure information of the contactless smart card 105. The mobile device 120-1 may not have encryption keys to decrypt the encrypted information. Instead the mobile device 120-1 can write to the contactless smart card by transparently passing the encrypted information along to the contactless smart card, bypassing the secure element 130 and simply modulating the encrypted information with the NFC transceiver 125 in accordance with related NFC protocols. The contactless smart card 105 can then update secure information stored in memory using the encrypted information. The contactless smart card 105 can then communicate to the mobile device 120-1 and/or central computer host 175 using encrypted and/or non-encrypted data to indicate whether the memory has been successfully (or unsuccessfully) updated.

Figure 1B:
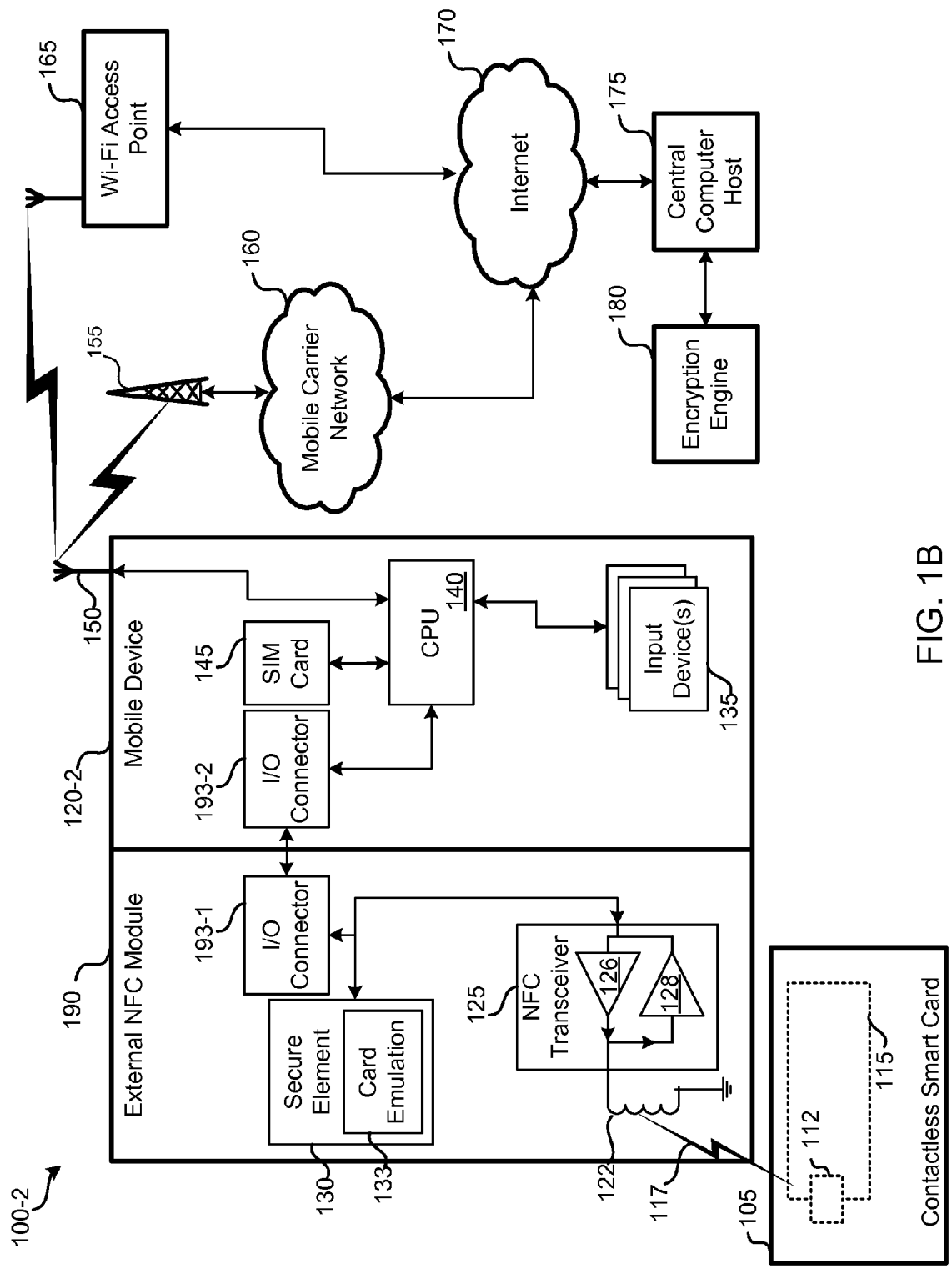

FIG. 1B is a simplified hardware block diagram of a second embodiment 100-2 of a system for enabling a mobile device 120-1 to communicate with the smart media. The second embodiment 100-2 of FIG. 1B is similar to the first embodiment 100-1 of FIG. 1A. Here, however, a second mobile device 120-2 without native NFC capability is used. Instead, the mobile device 120-2 is given NFC capabilities by an external NFC module 190, such as a mobile device sleeve or dongle, which includes some or all of the NFC-related components.

The mobile device 120-2 and external NFC module 190 can be communicatively coupled using respective input/output (I/O) connectors 193. The mobile device's I/O connector 193-2 can include a generic or specialized interface, such as a serial port, mini universal serial port (USB), parallel port, and the like, and the external NFC module's I/O connector 193-1 can include a port configured to communicate with the mobile device's I/O connector 193-2.

It will be understood that the embodiments provided in FIGS. 1A and 1B, as well as other embodiments detailed herein, are provided as non-limiting examples, that may not include every component for each embodiment. The external NFC module, for example, may include a processing unit, memory, and/or other subcomponents. The contactless smart card 105 can be replaced with any of a variety of smart media, including credit and/or debit cards, RFID tags, and the like. Moreover, the smart media may be physically attached to the mobile device 120 and/or external NFC module 190 (e.g., as a sticker or other item adhesively coupled to the mobile device). The central computer host 175 and/or encryption engine 180 may be a cloud-based and/or networked system of computers. Embodiments may also include using card emulation 133 in addition or as an alternative to smart media, and/or the use of an external card reader in addition or as an alternative to the external NFC module 190. A person of ordinary skill in the art will recognize many additions, substitutions, and other variations.

Figure 2:
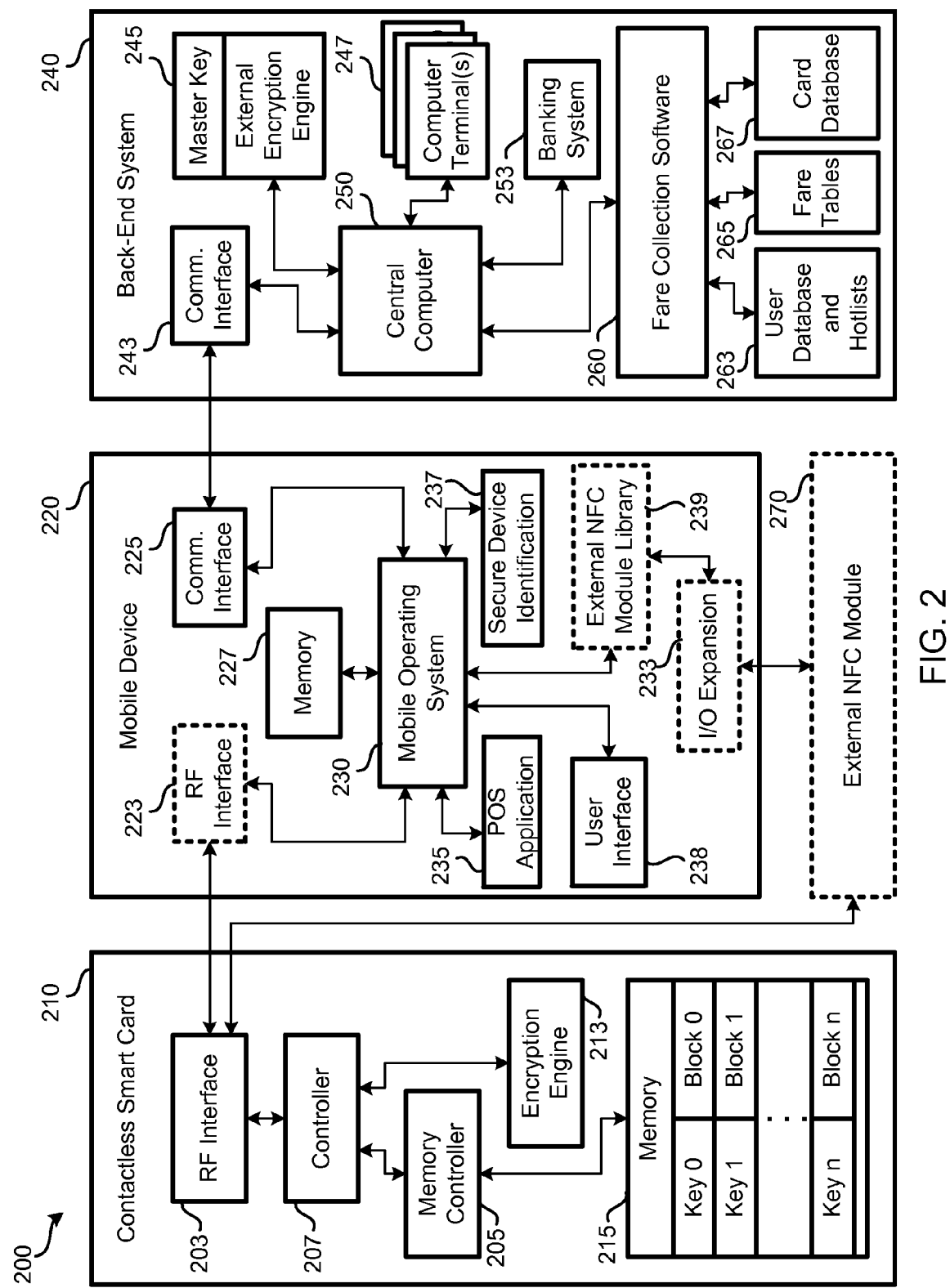
FIG. 2 is a simplified software block diagram a system for enabling a mobile device to communicate with the smart media, according to one embodiment in a transit system context.

FIG. 2 is a simplified software block diagram a system 200 for enabling a mobile device to communicate with the smart media, according to one embodiment in a transit system context. That said, the components depicted in FIG. 2 may be implemented in a variety of combinations of hardware and software, some of which (such as the contactless smart card 210, mobile device 220, and central computer 250) may correspond with components depicted in FIGS. 1A and/or 1B. As with other figures provided herein, the system 200 shown in FIG. 2 is provided as a non-limiting example.

In this system 200, the contactless smart card 210 can include an RF interface 203, controller 207, memory controller 205 memory 215, and encryption engine 213. The encryption engine 213 can store, generate, and/or manage one or more encryption key(s) to help ensure sensitive information stored in memory 215 is not communicated via the RF interface 203 without proper encryption. The memory can store information such as a value, counter, product, and the like, that may be used in one or more of a variety of applications, such as transit fare, event ticketing, payment systems, etc. Different blocks of memory may be encrypted with different keys and have different access conditions. Furthermore, components of the contactless smart card 210 can further ensure that only authorized entities are provided read and/or write access to memory 215.

Mobile device 220 can include memory 227, communication interface 225, point-of-sale (POS) application 235, secure device identification 237, and user interface 238, each of which can communicate with, be integrated into, and/or be managed by mobile operating system (OS) 230. In some embodiments, such as those in which an external NFC module 270 is not utilized, the mobile device can include an RF interface 223. The mobile OS 230 and/or other applications can be stored in memory 227 and executed by the mobile device, for example, upon device startup or upon receiving certain user input and/or detecting other triggering events.

The POS application 235 can be an application executed by the mobile device 220 with which the user may initiate various point-of-sale functions related to the contactless smart card 210. In a transit context, for example, such functions can include purchasing a new product or service (e.g., a 20-ride pass, month-long pass, etc.) and/or validating a ticket (e.g., debiting a card and canceling a ticket). The POS application 235 can be evoked by user input (e.g., pressing a link of a user interface 238 shown on a touch-screen display of the mobile device 220) and/or when the mobile device 220 detects the contactless smart card 210. The POS application 235 also can receive input, such as a login ID, password, and/or other identifier, to send to a central computer 250, which may be used to identify a user and/or establish a secure connection between the mobile device 220 and the central computer 250.

The operation of POS application 235 may vary, depending on desired functionality. For example, a user may execute the POS application 235 on a personal mobile device 220 to initiate point-of-sale functions related to a contactless smart card 210. Additionally or alternatively, the POS application 235 may be used by an agent and/or vender to initiate point-of-sale functions related to the contactless smart card 210 of a customer. In either case, and in other scenarios, the secure device identification 237 (which can be related to a SIM card 145 of FIGS. 1A and 1B) can identify the mobile device 220 to the back-end system 240 for tracking and/or login purposes. In some embodiments, the POS application 235 can be a client program that communicatively connects with a server program executed by the central computer 250. In some embodiments, the POS application may be a browser-based program that enables users to initiate point-of-sale functions via a web portal.

The RF interface 223 of the mobile device 220 can include an NFC transceiver and/or antenna that enables the mobile device 220 to communicate with the contactless smart card 210. Additionally or alternatively, as shown in FIG. 1B, NFC and/or other wireless functionality may be provided by an external NFC module 270. In embodiments in which an external NFC module 270 is utilized, the mobile device 220 can include an external NFC module library 239, enabling the mobile operating system 230 to communicate with and/or manage any of a variety of external NFC modules 270, which can be manufactured by third parties. The external NFC module library 239 can communicate with the external NFC module via an I/O expansion module 233 of the mobile device 220.

In addition to the central computer 250, the back-end system 240 can include a variety of additional components, depending on desired functionality. Components can include an external encryption engine 245 (which may have a master key, as indicated), one or more terminal computer(s) 247, connection to a banking system 253, and fare collection software 260 that communicates with a user database and hotlists 263, fare tables 265, and/or card database 267. Terminal computer(s) 247 can be any of a variety of machines or devices (computers, vending machines, etc.) that can provide point-of-sale and/or other functionality related to the transit system. As discussed earlier, components shown in FIG. 2 may be utilized in a transit system, but components may vary depending on application. A person having ordinary skill in the art will recognize many substitutions, alterations, and variations.

The mobile device 220 can communicate with the back-end system 240 via respective communication interfaces 225 and 243. As indicated previously, the central computer 250 can utilize information from the mobile device 220 to identify the mobile device 220 and/or a user associated with the mobile device 220. For example, a transit system may be an account-based system in which users can create accounts that are maintained by fare collection software 260 and stored in the user database and hotlists 263. An account-based system can enable the transit system to store payment information (e.g., credit card information, bank account, transit benefit account) associated with a user in the card database 267 and/or user database and hotlists 263. In this manner, the mobile device 220 may not need to communicate payment information to the central computer 250. Rather, the central computer 250 can use payment information stored in the card database 267 and associated with a user in the user database and hotlists 263 and/or user database and hotlists 263 to pay for a product or service requested by a user using the mobile device 220.

The back-end system can process payments by utilizing a connection to a banking system 253. Payments may be processed periodically in batches, or may be processed in real- or near-real time. Moreover, the central computer 250 can communicate information to the mobile device 220 indicating whether a payment was successfully made. Depending on the product or service requested by a user via the mobile device 220, the central computer 250 can gather information from the fare tables 265 (e.g., to calculate a fare) and/or card database (e.g., to verify and/or authenticate a contactless smart card) via the fare collection software 260 to calculate an amount of payment and/or a value to add, deduct, or write to the contactless smart card 210.

What is written to the contactless smart card 210 can vary, depending on desired functionality. For example, in addition or as an alternative to the account-based system described above, the system can provide for writing one or more secure token(s) to the contactless smart card 210 (or other smart media) without requiring the need for separate fare payment. With regards to bank cards, such as credit and/or debit cards, this information may be written to a scratch pad (i.e., unused portion of memory) of the bank card, thereby enabling the bank card to be utilized as a fare token, ticket, and/or other media, depending on the application.

Figure 3:
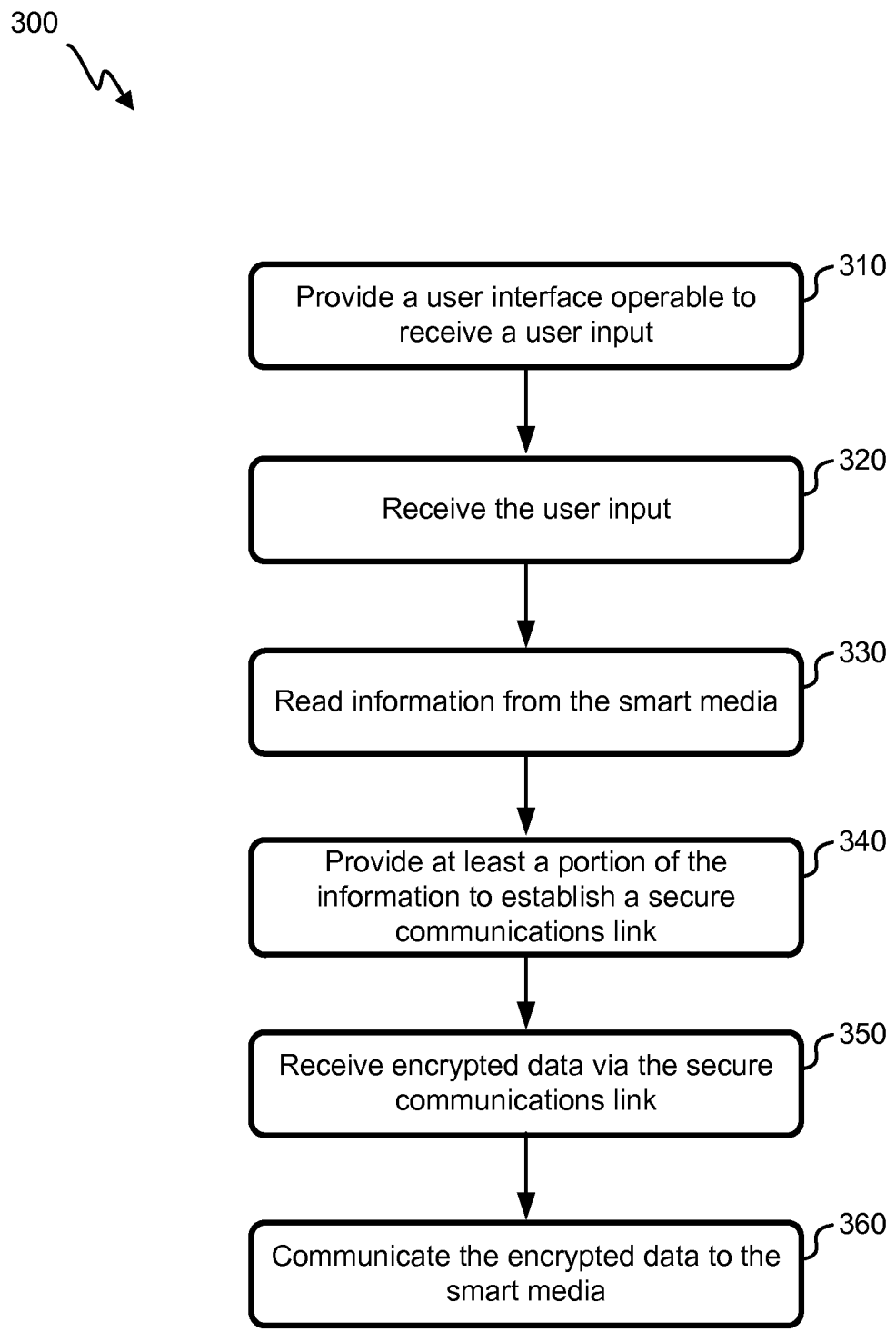
FIG. 3 is a flowchart representing a method for enabling a mobile device to communicate data to be written on a smart media, such as a contactless smart card, according to one embodiment.

FIG. 3 is a flowchart representing a method 300 for enabling a mobile device to communicate data to a smart media, such as a contactless smart card, according to one embodiment. The method, which can be executed by the mobile device, can begin at block 310, where a user interface is provided, where the user interface is operable to receive a user input. As discussed previously, the user interface can include a graphical user interface on a display of the mobile device. User input may be received in any of a variety of ways, depending on desired functionality and hardware capabilities of the device. For example, user input can be received via buttons, a keypad, touchscreen, microphone, camera, motion sensors, and the like.

At block 320, the user input is received. User input can include any of a variety of information, such as login information, payment source information (e.g., credit card information, debit card information, etc.), payment amount information, an indication of a product or service for purchase, and the like. The user input may also indicate and/or depend on a desired point-of-sale transaction the user wishes to make on the mobile device.

At block 330, information is read from the smart media. The information read from the smart media can include a card number, serial number, and/or other identifier, which may be used to help identify the smart media to a central computer. The information read from the smart media may be data that is not encrypted and/or secured, and therefore accessible to the mobile device without the user of encryption keys. The information read from the card may also depend on the input received from the user. For example, an indication that a certain point-of-sale transaction is desired may cause the mobile device to read a serial number from the smart media to provide to a central computer.

At block 340, at least a portion of the information is provided to establish a secure communication link with a remote computer. For example, the mobile device may provide a unique manufacturer serial number or other identifier of the smart media to a remote computer. The remote computer can then use a card database, encryption engine, and/or the like to determine one or more encryption key(s) to use to establish a secure communications link. Other information, such as user login information, mobile device identification information, etc., may also be used to establish the secure communications link.

At block 350, encrypted data is received via the secure communications link. As indicated previously, the mobile device may not decrypt the encrypted data. Instead, at block 360, the encrypted data may be written to the smart media. The mobile device may do so by simply sending the encrypted data to the smart media with no decryption. In so doing, the mobile device may bypass a secure element. Bypassing the secure element may be done by utilizing a specific operating system procedure, which may depend on the mobile device.

Figure 4:
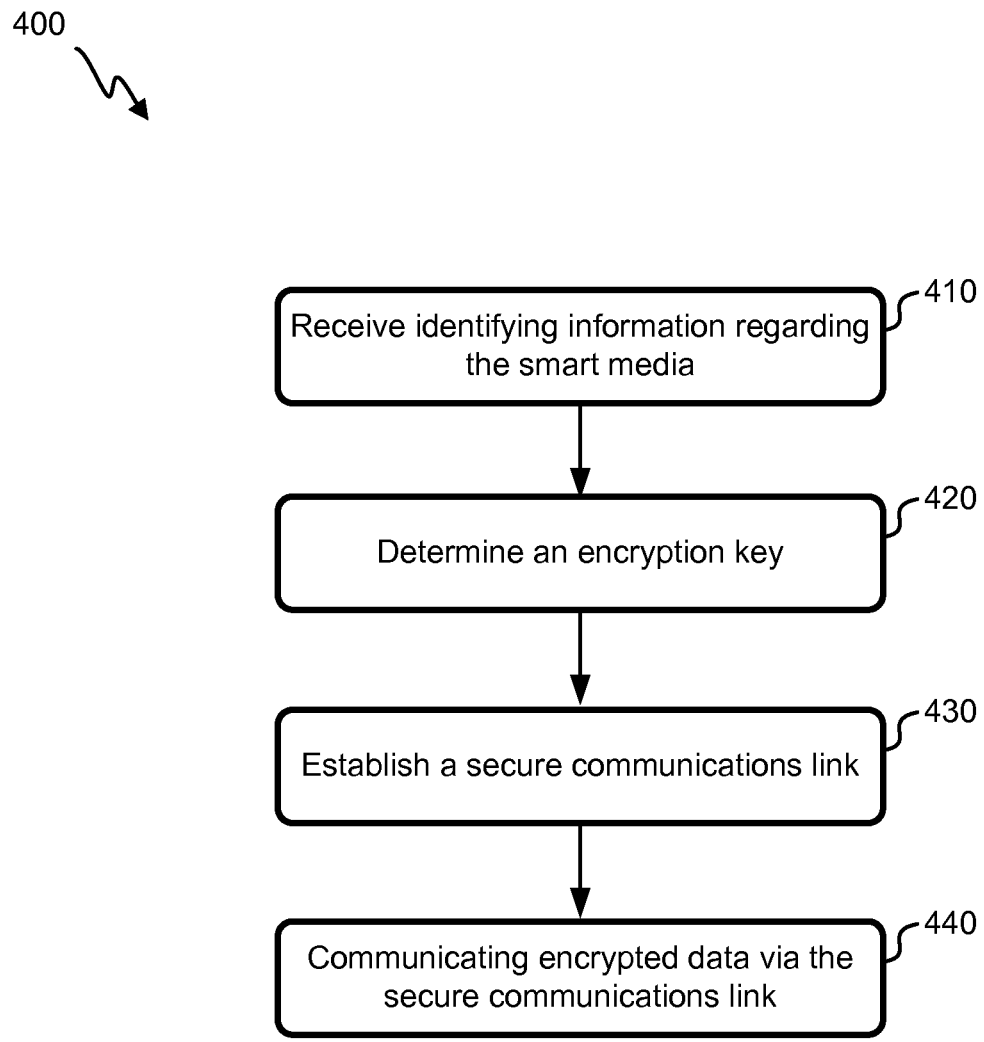
FIG. 4 is a flowchart representing a method for method for enabling a mobile device to communicate with a smart media, which can be performed by a computer, according to one embodiment.

FIG. 4 is a flowchart representing a method 400 for method for enabling a mobile device to communicate with a smart media, which can be performed by a computer of a back-end system (such as the centralized computer host 175 of FIGS. 1A and 1B, and/or the central computer 250 of FIG. 2). The method 400 of FIG. 4 can be performed, for example, by a computer in communication with a mobile device performing the method 300 of FIG. 3.

At block 410, identifying information regarding the smart media is received. The identifying information can include a card number, serial number, and/or other identifier of the smart media. Additionally or alternatively, identifying information can include user identification information, such as a username, password, etc. The information can be verified against data in a database or otherwise stored in a memory, local to or remote from the computer. Other information, such as login information, payment source information, payment amount information, and/or an indication of a product or service to purchase, may also be received.

At block 420, an encryption key is determined. In some embodiments, the encryption key can be determined by utilizing, for example, a lookup table that associates identifying information regarding the smart media with an encryption key. In some embodiments, determining the encryption key may include communicating with an external encryption engine. As indicated previously, a master key and/or multiple encryption keys may be used. The keys can be diversified, based on the serial number of the smart card and the master key.

At block 430, a secure communications link is established. The secure communications link, which can be established between the computer and the mobile device, can be based on at least a portion of information read from the smart media by the mobile device. For example, encryption of the secure communications link can utilize an encryption key associated with an identifier read from the smart media.

At block 440, encrypted data is communicated via the secure communication link. The encrypted data can include any of a variety of data, which can be written to the smart media. For example, the encrypted data can include a value (e.g., a counter, monetary value, credit value, etc.) used to track the smart media's usage in a transit system. Additionally or alternatively, for ticket validation, such encrypted data can include an indication that a ticket related to the smart media has been used and/or is otherwise no longer valid.

It should be appreciated that the specific steps illustrated in FIGS. 3-4 provide example flowcharts illustrating embodiments of methods for enabling a mobile device to communicate with a smart media. Alternative embodiments may include alterations to the embodiments shown. For example, alternative embodiments may include reading and/or writing information to and/or from the smart media at different times. Furthermore, additional features may be added or removed depending on the particular applications. One of ordinary skill in the art would recognize many variations, modifications, and alternatives.

Not all users may have access to a mobile device having internal or external NFC functionality. However, techniques provided herein can apply equally to card readers and/or other devices capable of writing to smart media (e.g., via NFC) and which may be deployed and/or maintained by a third party. By leveraging card readers of third-party networks, a smart media system (i.e., a system in which smart media is used, such as a transit, parking, banking system, etc.) can make products and/or services requiring reading and/or writing to smart media far more accessible. For example, a transit system may negotiate an agreement with a third-party network, such as a bank, parking meter provider, and the like, to enable transit users to purchase products and services from the transit provider using a network of card readers such as ATMs, parking meters, etc.

Figure 5:
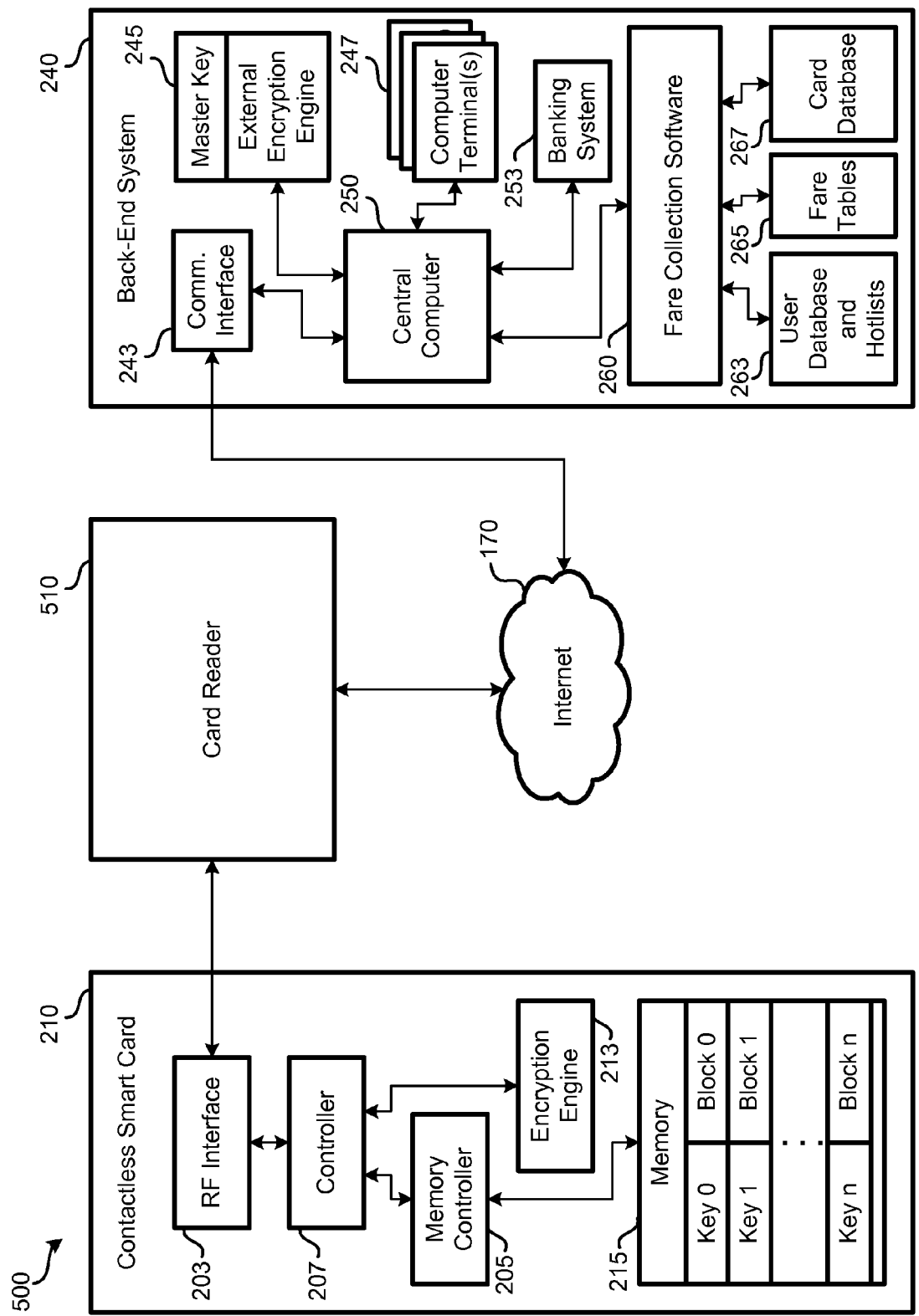
FIG. 5 is a simplified block diagram of a system in which a card reader is utilized to read from and/or write to a contactless smart card, according to one embodiment.

FIG. 5 is a simplified block diagram of a system 500 in which a card reader 510 is utilized to authenticate with, read from, and/or write to a contactless smart card 210, according to one embodiment. Components are similar to those described in relation to FIG. 2, and processes similar to those described in FIGS. 3 and 4 can be utilized. Here, however, rather than a mobile device 220, a card reader 510 can be utilized to read from and/or write to the contactless smart card 210. As with other figures herein, embodiments may include different components than those shown in FIG. 5. Additional and/or alternative components may be utilized. For example, a card reader may be utilized that is not necessarily from a third party, but from an entity that deploys and/or maintains one or more components of the back-end system 240. Additionally or alternatively, embodiments may work with smart media other than a contactless smart card 210, such as a virtual card residing on an electronic device (e.g., a mobile phone or other mobile device), a credit card, a debit card, a radio-frequency identification (RFID) tag, and the like. A person of ordinary skill in the art will recognize many variations.

In the embodiment shown in FIG. 5, the back-end system 240 can establish a secure communications channel to the contactless smart card 210 (or other smart media) via the card reader 510. To do so, the card reader 510 may access the back-end system 240 in a manner similar to the mobile device in the previously-described embodiments. This can include, for example, utilizing specialized hardware and/or software to execute an application programming interface (API), or using generic software, such as an Internet browser, to establish the secure connection between the contactless smart card 210 and the back-end system 240. In some embodiments, once this connection is established, the back-end system may be able to authenticate with, read from, and/or write to the contactless smart card directly 210 without any decryption by the card reader 510 of the information written to and/or read from the contactless smart card 210, which can help preserve the security of the connection when a third-party card reader 510 is used.

The card reader 510 can have any of a variety of features, depending on desired functionality. For example, the card reader 510 can be installed at location that is convenient for patrons such as a bus station, bus stop, rail station, convenience store, sports stadium or even a transit vehicle, etc. The card reader 510 can include features such as communications ports and software to securely connect to the back-end system 240 using wired and/or wireless services, public and/or private networks, and/or other communications services. Furthermore, the card reader 510 can have the ability to handle a variety of contactless smartcard types that are valid in a transit (or other) system, such cards conforming to ISO 14443 standards. Establishing a secure link between the contactless smart card 210 and the back-end system 240 can be accomplished using encryption in the back-end (e.g., external encryption engine 245) and/or security incorporated into the card reader 510 itself. The card reader 510 can also include the ability to be powered locally by a number of discrete power sources including AC, DC, battery, solar power, rechargeable battery, USB, and the like, which may vary depending on the type of system (e.g., parking, banking, etc.) the card reader 510 may be a part of.

The functionality of the card reader 510 to a contactless smart card user may also vary. Users, such as transit patrons or retail agents, can have the ability to purchase products or services (e.g., add value to a transit pass, buy one or more transit passes), and/or initiate receipt of benefits that can be delivered to the contactless smart card 210. Some embodiments may further utilize an application executable by a mobile device (not shown) that can perform any of a variety of functions. For example, the application can direct a user to a nearby card reader 510.

A mobile device application can also be used to initiate transactions involving authenticating with, reading, and/or writing to the contactless smart card 210. For example, a mobile device application can be used to connect securely to the back-end system 240 and/or an Internet web site, enabling the user to log in securely (e.g., by using a unique username and password, connecting anonymously, etc.). The application may further be used to store or use a payment credential, such as a debit/credit card, bank account or transit benefit, which can be used to fund any purchases made via this service. The application may also be used to initiate the loading of a value to the contactless smart card 210 using an authorized payment credential. The value can be, for example, a transit pass, stored value, single or multi-ride pass (which is valid on a transit agency's system) and/or other product, a unique reference transaction, an updated command (e.g., to "hotlist" or "unhotlist" a contactless smart card 210), a deducted value (indicating a debit from the card a monetary value or ride amount), and/or validation of a pass. The application may additionally or alternatively be used to authenticate the contactless smartcard to be used as a token where the back-end system is using account-based technology. The back-end system 240 can authorize payment for the value. Once payment has been authorized, the back-end system 240 can record the transaction in a database and add transaction details to an electronic list that can optionally be securely accessed by the card reader 510 and/or the mobile phone application. The back-end system 240 can optionally send an encrypted record of the transaction, which may include a digital signature, to the mobile phone that initiated the transaction. And the encrypted record can be stored by the mobile phone application. Alternatively, functionality similar to the mobile device application described above may be provided by a browser-based application and/or software executed by a personal computer or other electronic device that may not be a mobile device.

Once payment has been approved for the transaction, the user may be able to update the contactless smartcard by writing the value directly, or by writing a unique digitally signed transaction, to the contactless smart card 210, by visiting the card reader 510. In one embodiment, for example, a user may stand next to the card reader 510 and access an application on a mobile device. The application may be executed automatically upon detection of the card reader 510, QR code, NFC tag, and/or other triggering event. In some embodiments, the mobile device application can automatically connect to the card reader 510 using any of a variety of wireless communications protocols and/or technologies, including Bluetooth, 802.11, WiFi, NFC, and the like. The mobile device application and the card reader 510 can help ensure that the communications is secure by using cryptographic standards. The mobile device application can then send a command to the card reader to update the contactless smart card 210 and instruct the user to tap the contactless smart card 210 to the card reader 510. The card reader 510 can then verify that there is a valid transaction pending for the card serial number by checking an action list or autoload list (comprising information for updating contactless smart cards 210, such as a list of contactless smart cards 210 with corresponding values or instructions to update the contactless smart cards 210) received from the back-end system 240, contacting the back-end system 240 immediately to get an updated action list or autoload list, and/or obtaining an encrypted transaction record from the mobile device, which can include obtaining a digital signature. The card reader 510 can then authenticate the mobile device transaction record using security features local to the card reader 510 or by authorizing the request via the back-end system 240. If the transaction is authenticated, then the card reader 510 can securely update the contactless smart card 210 with the proper value. The contactless smart card 210 can be updated using security either embedded in the card reader 510, or using a security module at the back-end system 240. The contactless smart card 210 can then record the transaction on the mobile device and at the back office server. Recording the transaction can include communicating a transaction summary, which can include information regarding the transaction such as a time, date, value, location, and the like.

Other embodiments may incorporate additional or alternative features. For example, the system 500 can include postal meters contained inside the third-party card readers 510 to limit the total of value if the card reader 510 is in an offline scenario. The card reader 510 can contact the back-end system 240 periodically to update the stored transactions and reset the postal meter. Some or all of the functionality described in the mobile device application (e.g., purchasing a product or service, storing transaction data, etc.) may be available on the card reader 510 itself (or a device coupled therewith, such as an ATM), depending on desired functionality.

In some embodiments, the card reader 510 can behave in a more transparent manner. For example, encryption and/or other security may be handled entirely by the back-end system 240 and contactless smart card 210, with no decryption of transaction content occurring on the card reader 510. In this manner the card reader 510 can essentially function as a transparent device through which the back-end system 240 can read from and/or write to the contactless smart card 210.

Figure 6:
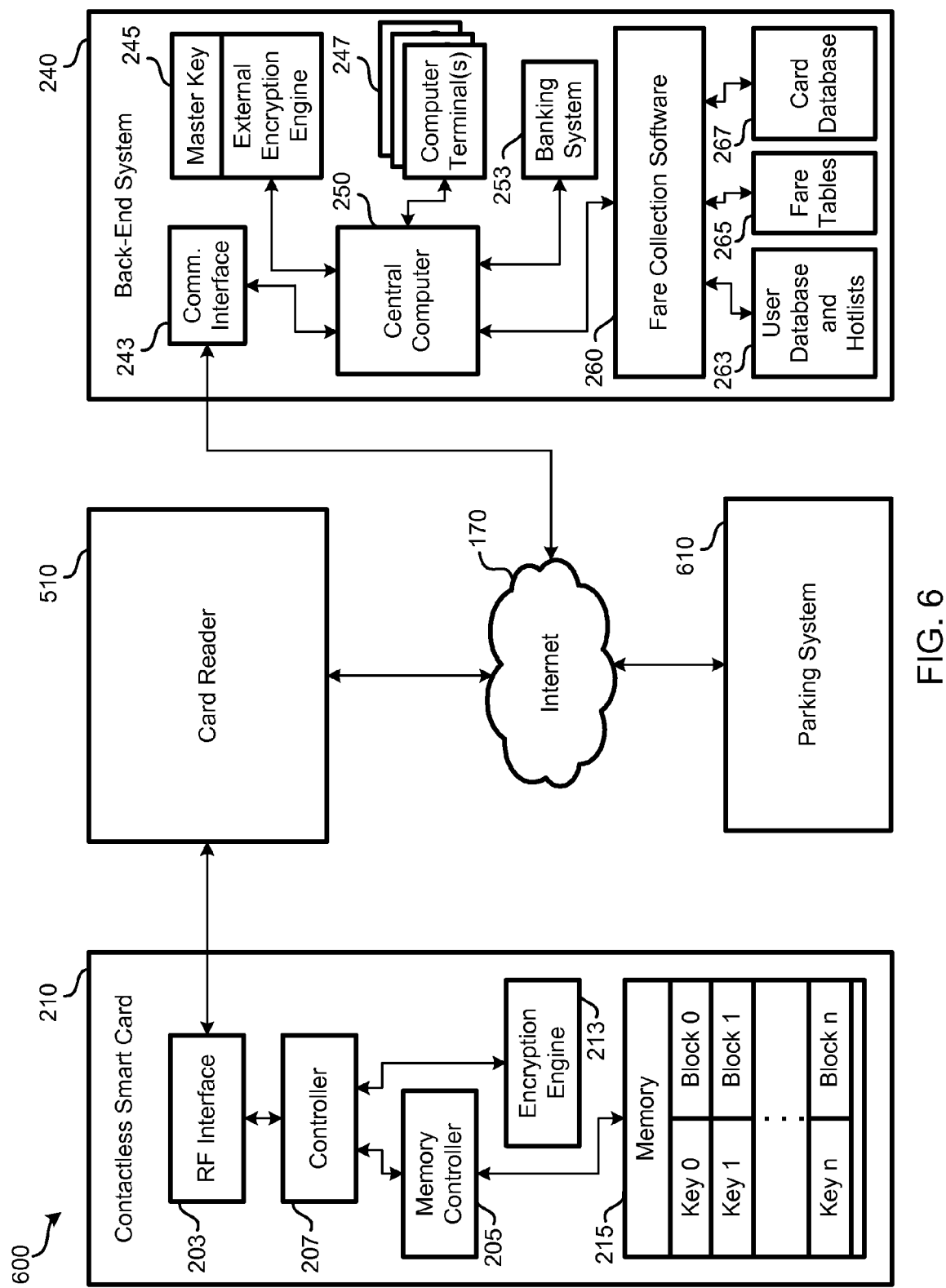
FIG. 6 is a block diagram of an embodiment of a system in which the back-end system performs transactions for a parking system.

Although embodiments described herein have been directed primarily toward a transit system, the invention is not so limited. For example, the back-end system 240 can be utilized in a system other than transit that utilizes smart cards and/or other smart media. FIG. 6 is a block diagram of an embodiment of a system 600 in which the back-end system 240 performs transactions for a parking system 610. Although the back-end system 240 and parking system 610 are linked only via the Internet 170 in the illustrated embodiment, other embodiments may include additional degrees of integration between the back-end system 240 and parking system 610, such as the usage of a private network and/or sharing one or more components (e.g., databases, servers, etc.) between the two systems. Furthermore, embodiments may incorporate the usage of a stand-alone back-end system that is not integrated with a particular system, and/or the usage of additional and/or alternative systems (e.g., parking, transit, banking, etc.) that may utilize the back-end system 240 to read from and/or write to a contactless smart card 210. In such instances, the contactless smart card 210 may be utilized in one or more of the plurality of systems to pay for and/or use products and/or services offered by the one or more systems.

In the illustrated embodiment, the card reader 510 can be one of many third-party card readers 510, each incorporated into or otherwise associated with one or more parking meters and connected to the Internet 170 via, for example, a wireless technology such as a cellular digital modem. In this embodiment, a user can purchase a product or service using an interface coupled or connected to the card reader 510 such as a touch screen, keypad, etc., and/or using an application on a mobile device in a manner similar to the embodiments regarding a transit system previously described. The product or service (e.g., a parking pass) is priced by the card reader 510 and/or parking system 610, and a purchase amount is billed to a payment card on file, a cloud or virtual wallet (such as PayPal®, V.me®, Google Wallet®, MasterPass®, etc.), a linked debit account via ACH, a pre-tax parking account conforming to all relevant IRS regulations, and/or other payment source, which may be linked to the contactless smart card 210. For embodiments in which a mobile device application is used, location services of the mobile device (e.g., GPS) can indicate that the user is standing near a participating parking meter, and the user can be presented with the location and meter number of collection. The user can then be directed, by the mobile device application and/or a user interface of the parking meter, to tap their contactless card to the card reader 510 coupled to the parking meter. Upon detecting the card, the parking meter can establish a connection, via the Internet 170, with the back-end system 240, which can issue update commands over the connection to write a value (e.g. "top up") to the contactless smart card 210. The back-end system 240 can then post a transaction summary to the parking system 610 (e.g., a database of the parking system 610).

Embodiments can additionally or alternatively allow a user to inserting currency into a parking meter associated with the card reader 510. For example, when a user taps the contactless smart card 210 to the card reader 510, the card reader 510 can establish a communication channel the back-end system 240. If there is no pending load to the contactless smart card 210, the user can be prompted to buy time (and/or another product or service offered by the parking system 610), and/or load value to the contactless smart card 210. When electing to load value to the contactless smart card 210 or the back-end account associated with the contactless smartcard 210, the user can then be prompted to tender coins, notes, or payment card to the parking meter. If the user chooses to use currency, the user can insert coins and/or notes into the parking meter, which can tabulate the total amount tendered. When the user is finished tendering currency, the parking meter can display the total tendered, and the user can push a confirmation key (and/or provide another type of user input) that delivers the transactional amount to the back-end system 240. The user can then be directed to present the contactless smart card 210 to the card reader 510, and the back-end system 240 can cause the card reader 510 to load a corresponding value the contactless smart card 210 or back-end account associated with the contactless smartcard 210. The back-end system 240 can then post an appropriate transaction summary to the parking system and/or other system in which the contactless smart card 210 is used. (This embodiment can, for example, enable a user to top up a contactless smart card 210 used in a transit system by making a payment at a parking meter of the parking system 610.) A similar process may be used to top up any other type of smart media, such as a virtual card residing on a smart phone (e.g., using NFC).

Embodiments may similarly allow a user to load a value to a contactless smart card 210 using a credit or debit card into the meter. For example, the user can tap the contactless smart card 210 to a parking meter's card reader 510. The contactless smart card 210 then establishes a channel to back-end system 240. Seeing no pending load waiting, the user can be prompted (e.g., by a monitor or other user interface on the parking meter) to buy time or load value to (e.g., top up) the contactless smart card 210. If the user chooses to load value, the user is invited to tender coins, notes, or payment card. In the case in which a user elects to use a payment card, the user can enter the amount desired to purchase (or select a corresponding product or service with a fixed amount). The user can then be directed to insert a payment card, and the meter's processing system (not shown) can collect an authorization from the payment network and advise the back-end system 240 of the valid tender and amount. The user can then be directed to present the contactless smart card 210 to the reader, and the back-end system 240 can use the link established via the card reader 510 to update the card or the back-end account with the approved amount. The back-end system 240 can then post an appropriate transaction summary to the parking system and/or other system in which the contactless smart card 210 is used.

Embodiments can also enable a contactless smart card 210 to be used for products or services of the parking system 610. For example, a user can tap the contactless smart card 210 to the card reader 510, which establishes a communication channel to the back-end system 240. If there is no pending load waiting, the user can be prompted to buy time (or purchase another product or service) or load value to the contactless smart card 210. If the user chooses to buy time, the parking meter can walk the user through a standard process of time selection based on zone/length of stay. The user can then be presented with the amount due and the tender options including the contactless smart card 210. When the user selects the contactless card option and presents the contactless smart card 210 by tapping it to the card reader 510, the back-end system 240 then debits the contactless smart card 210, via the card reader 510, of the indicated value (e.g., by writing a new value to the contactless smart card 210 that reflects a debit of the payment or the back-end account associated with the contactless smartcard 210). The back-end system 240 can then post an appropriate transaction summary to the parking system and/or other system in which the contactless smart card 210 is used.

By leveraging card readers 510 from any of a variety of card systems, transit and other systems can help ensure that patrons have easy access to functions requiring reading from and/or writing to contactless smart cards 210 and/or other smart media. Additionally or alternatively, embodiments may further leverage the connectivity of a user's mobile device 120 to access the back-end system 240 to carry out transactions, as illustrated in FIG. 7.

Figure 7:
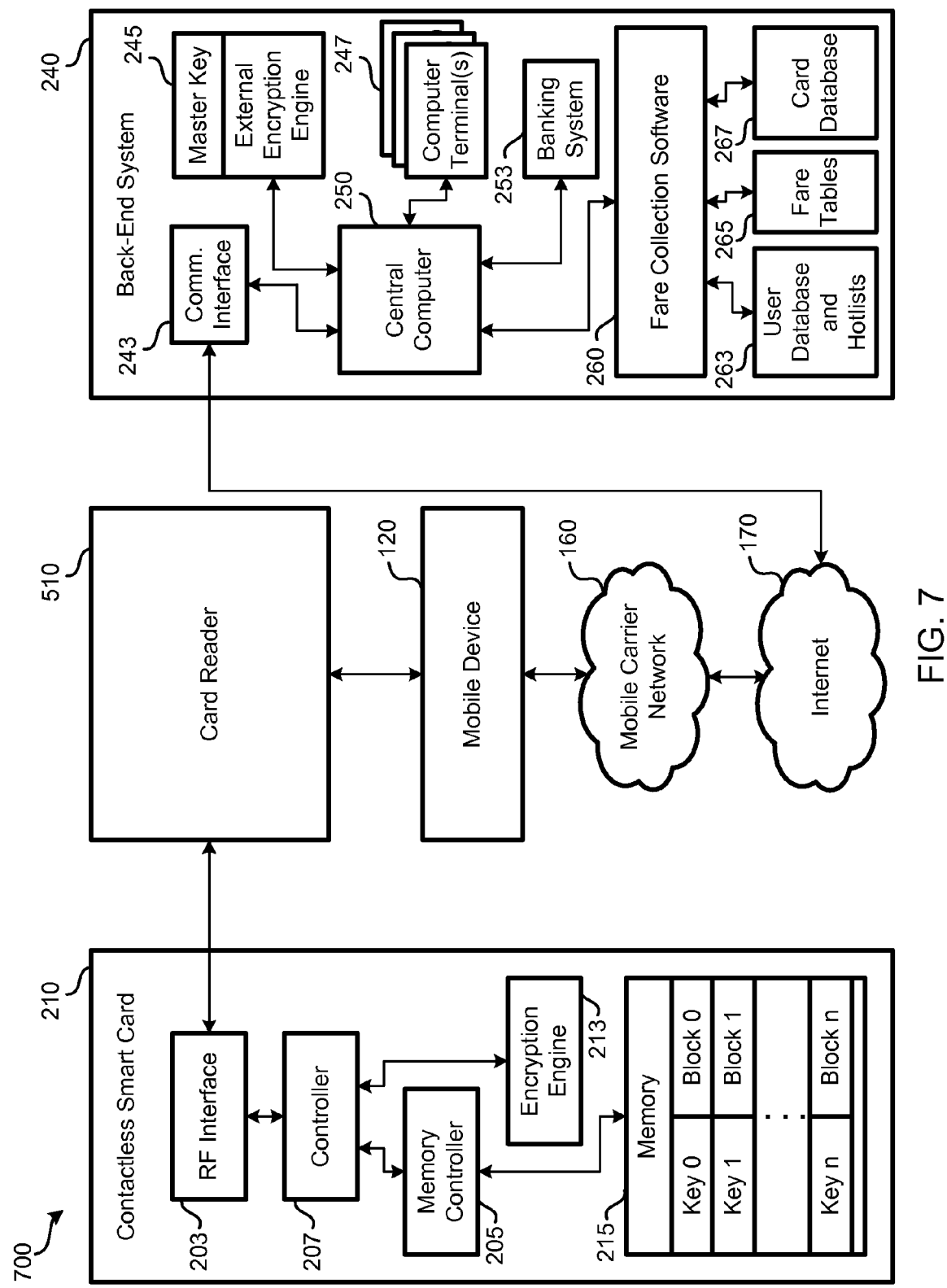
FIG. 7 is a block diagram of an embodiment of a system in which a card reader connects with a back-end system via a mobile device.

FIG. 7 is a block diagram of an embodiment of a system 700 in which a card reader 510 connects with a back-end system 240 via a mobile device 120. This can further reduce costs compared with a system in which each card reader 510 is natively connected with a cellular network. This system 700 can provide functionality similar to embodiments previously discussed. However, rather than including a cellular modem in the card reader 510, the card reader may be equipped with other technology, such as a wireless (e.g., Bluetooth, 802.11, WiFi, NFC, etc.) and/or wired technology enabling the card reader 510 to communicate with a mobile device 120. The mobile device can be provided, for example, by a retail agent or end user (e.g., contactless smart card owner). In some embodiments, an application can be executed by the mobile device 120, which may facilitate and/or automatically establish communication between the card reader 510 and the mobile device 120, which may be based on a detected location of the mobile device 120, detection of a wireless signal transmitted by the mobile device 120 and/or card reader 510, and/or other factors. Once the communication is established between the card reader 510 and the mobile device 120, a secure link between the contactless smart card 210 and the back-end system 240 can be established in a manner similar to previously-described embodiments.

In the foregoing description, for the purposes of illustration, methods were described in a particular order. It should be appreciated that in alternate embodiments, the methods may be performed in a different order than that described. It should also be appreciated that the methods described above may be performed by hardware components and/or may be embodied in sequences of machine-readable instructions, such as programming code, which may be used to cause a machine, such as a general-purpose or special-purpose processor or logic circuits programmed with the instructions to perform the methods. These machine-readable and/or computer-readable instructions may be stored on one or more non-transitory storage mediums, such as CD-ROMs or other type of optical disks, floppy diskettes, ROMs, RAMs, EPROMs, EEPROMs, magnetic or optical cards, flash memory, or other types of machine-readable storage mediums suitable for storing electronic instructions.

With this understanding, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable storage medium, such as those described above. A processor(s) may perform the necessary tasks.

Embodiments provided herein are examples only, and is not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed systems and methods as set forth in the appended claims.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method of establishing a secure connection with a smart media, the method comprising:
    receiving, from a card reader, unencrypted identifying information regarding the smart media;
    determining, with a computer, an encryption key based on the unencrypted identifying information;
    establishing a secure communications link between the computer and the card reader, wherein the secure communications link is established based on at least a portion of the unencrypted identifying information read from the smart media by the card reader; and
    communicating encrypted data to be written to the smart media by the card reader without decryption to the card reader, via the secure communications link.

2. The method of establishing the secure connection with the smart media as recited in claim 1, further comprising communicating a transaction summary to a smart media system.

3. The method of establishing the secure connection with the smart media as recited in claim 2, wherein the smart media system comprises a parking system database.

4. The method of establishing the secure connection with the smart media as recited in claim 1, further comprising:
    receiving, from the card reader, information indicative of a payment, and
    communicating, to the card reader, value data to be written on the smart media.

5. The method of establishing the secure connection with the smart media as recited in claim 4, wherein the value data comprises data corresponding to at least one of:
    a product,
    a unique reference transaction,
    an updated command,
    a deducted value, or
    validation of a pass.

6. The method of establishing the secure connection with the smart media as recited in claim 1, further comprising:
    receiving, from the card reader, information indicative of usage of the smart media, and
    debiting the smart media, via the card reader, a value associated with the usage of the smart media.

7. The method of establishing the secure connection with the smart media as recited in claim 1, wherein the smart media comprises at least one of:
    a contactless smart card,
    a virtual card residing on an electronic device,
    a credit card,
    a debit card, or
    a radio-frequency identification (RFID) tag.

8. The method of establishing the secure connection with the smart media as recited in claim 1, further comprising receiving, from the card reader, information indicative of user input.

9. The method of establishing the secure connection with the smart media as recited in claim 8, wherein the information indicative of the user input includes at least one of:
    login information,
    payment source information,
    payment amount information, or
    an indication of a product or service for purchase.

10. A non-transitory computer-readable medium having instructions embedded thereon enabling a smart media to be used at a card reader, the instructions including computer-executable code for:
    receiving, from a card reader, unencrypted identifying information regarding the smart media;
    determining an encryption key based on the unencrypted identifying information;
    establishing a secure communications link with the card reader, wherein the secure communications link is established based on at least a portion of the unencrypted identifying information read from the smart media by the card reader; and
    communicating encrypted data to be written to the smart media by the card reader without decryption to the card reader, via the secure communications link.

11. The non-transitory computer-readable medium as recited in claim 10, wherein the instructions further include computer-executable code for communicating a transaction summary to a smart media system.

12. The non-transitory computer-readable medium as recited in claim 11, wherein the instructions further include computer-executable code for communicating parking information to the smart media system.

13. The non-transitory computer-readable medium as recited in claim 10, wherein the instructions further include computer-executable code for:
    receiving, from the card reader, information indicative of a payment, and
    communicating, to the card reader, value data to be written on the smart media, the value data corresponding to a value of the payment.

14. The non-transitory computer-readable medium as recited in claim 10, wherein the instructions further include computer-executable code for:
    receiving, from the card reader, information indicative of usage of the smart media, and
    debiting the smart media, via the card reader, a value associated with the usage of the smart media.

15. The non-transitory computer-readable medium as recited in claim 10, wherein the instructions comprise computer-executable code for communicating with a smart media comprising at least one of:

a contactless smart card,
a virtual card residing on an electronic device,
a credit card,
a debit card, or
a radio-frequency identification (RFID) tag.

16. The non-transitory computer-readable medium as recited in claim 10, wherein the instructions further include computer-executable code for receiving, from the card reader, information indicative of user input.

17. The non-transitory computer-readable medium as recited in claim 10, wherein the instructions further include computer-executable code for receiving the information indicative of the user input comprising at least one of:
login information,
payment source information,
payment amount information, or
an indication of a product or service for purchase.

18. A computer server configured to establish a secure connection with a smart media via a card reader, computer server comprising:
a communications interface,
a processing unit coupled with the communications interface,
a memory coupled with the processing unit, and comprising instructions that, when executed by the processing unit, cause the computer server to:
receive, from a card reader, unencrypted identifying information regarding the smart media;
determine an encryption key based on the unencrypted identifying information;
establish, via the communications interface, a secure communications link with the card reader, wherein the secure communications link is established based on at least a portion of the unencrypted identifying information read from the smart media by the card reader; and
communicate encrypted data to be written to the smart media by the card reader without decryption to the card reader, via the secure communications link.

19. The computer server as recited in claim 18, wherein the memory further comprises instructions for causing the computer server to communicate a transaction summary to a smart media system.

20. The computer server as recited in claim 18, wherein the transaction summary comprises information regarding a parking transaction.

21. The computer server as recited in claim 18, wherein the memory further comprises instructions for causing the computer server to:
receive, from the card reader, information indicative of a payment, and
communicate, to the card reader, value data to be written on the smart media, the value data corresponding to a value of the payment.

* * * * *